United States Patent
Penttinen et al.

(10) Patent No.: US 7,335,409 B2
(45) Date of Patent: Feb. 26, 2008

(54) POLYMER-COATED HEAT-SEALABLE PACKAGING MATERIAL, METHOD FOR MANUFACTURING THE SAME AND A CLOSED PACKAGE MADE THEREOF

(75) Inventors: Tapani Penttinen, Huutjärvi (FI); Kimmo Nevalainen, Karhula (FI); Jalliina Järvinen, Lahti (FI)

(73) Assignee: Stora Enso Oyj, Helsinki (FI)

( * ) Notice: Subject to any disclaimer, the term of this patent is extended or adjusted under 35 U.S.C. 154(b) by 310 days.

(21) Appl. No.: 10/483,239

(22) PCT Filed: Jul. 12, 2002

(86) PCT No.: PCT/FI02/00632

§ 371 (c)(1), (2), (4) Date: Mar. 12, 2004

(87) PCT Pub. No.: WO03/006237

PCT Pub. Date: Jan. 23, 2003

(65) Prior Publication Data

US 2004/0258893 A1 Dec. 23, 2004

(30) Foreign Application Priority Data

Jul. 13, 2001 (FI) .................................. 20011539

(51) Int. Cl.
*B29D 22/00* (2006.01)
(52) U.S. Cl. .................... 428/34.2; 428/34.3; 428/532; 428/535; 428/536; 428/537.5
(58) Field of Classification Search ............... 428/34.2, 428/34.3, 532, 535, 536, 537.5
See application file for complete search history.

(56) References Cited

U.S. PATENT DOCUMENTS

| | | | |
|---|---|---|---|
| 5,712,006 A | 1/1998 | Marano et al. | |
| 5,993,977 A | 11/1999 | Laiho et al. | |
| 6,383,582 B1 * | 5/2002 | Salste et al. | 428/34.7 |
| 6,531,196 B1 * | 3/2003 | Aho et al. | 428/34.2 |
| 6,787,205 B1 * | 9/2004 | Aho et al. | 428/34.2 |
| 6,964,797 B2 * | 11/2005 | Salste et al. | 428/34.2 |

FOREIGN PATENT DOCUMENTS

| | | | |
|---|---|---|---|
| EP | 0 276 018 A2 | | 7/1988 |
| EP | 0276018 | * | 7/1988 |
| EP | 0934821 A | | 8/1999 |
| JP | 61-197239 A | | 9/1986 |
| JP | 8-134800 A | | 5/1996 |
| JP | 8-143029 A | | 6/1996 |
| SE | 507094 C | | 3/1998 |
| WO | WO9702140 A1 | | 1/1997 |

* cited by examiner

*Primary Examiner*—Leszek B. Kiliman
(74) *Attorney, Agent, or Firm*—Birch, Stewart, Kolasch & Birch, LLP

(57) ABSTRACT

The invention relates to a manufacturing method of a heat-sealable packaging material, a polymer-coated packaging material manufactured using the method, and a sealed package to be manufactured of the material. The packaging material comprises a fibre base, such as a packaging board (5), and an inner, extruded water vapour barrier layer (2, 9) on both sides, containing high-density polyethylene (HDPE), and an outer heat sealing layer (1, 10), the material of which is, for example, low-density polyethylene (LDPE). Further, polymeric oxygen barrier layers (7) can be incorporated in the packaging material, the material of the oxygen barrier layers being, for example, ethyl vinyl alcohol copolymer (EVOH) or polyamide (PA). With the HDPE layer, the permeation of water vapour is prevented to both directions, and the location of the extruded layers on both sides of the fibre base reduces the curling of the material. The packages according to the invention comprise carton, box and bag packages for dry and liquid foods.

24 Claims, 4 Drawing Sheets

Figure 1:
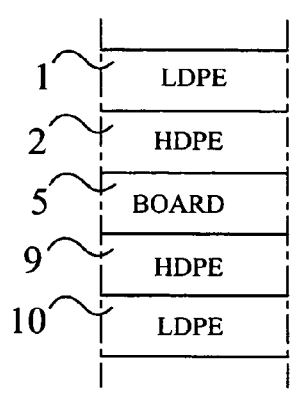

POLYMER-COATED HEAT-SEALABLE PACKAGING MATERIAL, METHOD FOR MANUFACTURING THE SAME AND A CLOSED PACKAGE MADE THEREOF

The invention relates to a method for manufacturing a heat-sealable packaging material, in which method both sides of a fibre base are provided with a polymeric heat sealing layer. Further, the invention relates to polymer-coated packaging material acquired by the method and to a package manufactured of it by folding and heat sealing.

Tightness is required especially from packaging materials used for packaging foods for preventing the premature deterioration of the product. Typically, simultaneous oxygen and water vapour tightness is required from packages for liquid foods, such as milk products and juices, whereas only good water vapour tightness is an essential requirement in packages for some dry foods. Unlike oxygen tightness, water vapour tightness can also be of importance not only for the protection of the packed product, but also for the protection of the packaging material itself, its fibre base and the polymeric coating layers.

Fibre-based packaging materials nowadays comprise different multi-layer coatings, in which different layers perform different functions. In such coatings, polymers forming a good oxygen barrier are especially ethylene vinyl alcohol copolymer (EVOH) and polyamide (PA). High-density polyethylene (HDPE) can be mentioned as a polymer rendering a good water vapour protection. In a multi-layer coating, low-density polyethylene (LDPE) has most often been used as the polymer for the topmost heat sealing layer, which also prevents the permeation of water vapour, although not as well as HDPE. In addition, polymeric binding agents may be needed in the multi-layer coatings of the packaging material to bind the layers to each other and to the fibre base, depending on the polymers used.

In practice, the folding of polymer-coated packaging material to sealable packages by jointing has always been done so that the multi-layer coating with incorporated oxygen and water vapour barrier layers becomes the interior surface of the package. The opposite side of the material, which will be the exterior surface of the package, is provided at most with a heat sealing layer of LDPE or a corresponding polymer, which gives protection against external moisture and makes it possible to joint together the opposite edges of the packaging blank that overlap each other in the folding. Especially in packages for liquid products, it has been the intention to prevent the packed product from wetting the fibre base and to leave the exterior surface of the package as free as possible for printing and patterning.

However, it has now been noted that problems may arise from placing the polymeric oxygen and/or water vapour barrier layers to the interior surface of the package so that the protection of the exterior surface of the package is left for the heat sealing layer only. Especially in tropical countries, in which the temperature and relative humidity of air are high, the ability of the most generally used LDPE to prevent the penetrating moisture is insufficient. The location of the barrier layers in the present packaging materials also has the drawback that the material prevents the permeation of water vapour and moisture in different ways in different directions.

A second problem concerning the HDPE water vapour barrier formed by extrusion has been the curling of the coated board, which is caused by the post-crystallisation of the HDPE occurring after the extrusion.

It is the object of the present invention, which is based on the above-mentioned observations, to solve the problem caused by the present fibre-based packaging materials and the insufficient water vapour barrier of packages joint from these. It is characteristic of the method of the invention for manufacturing the packaging material that a polymeric water vapour barrier layer containing high-density polyethylene (HDPE) is extruded on both sides of the fibre base so that the water vapour barrier layer is left between the fibre base and the outer heat sealing layer in the packaging material.

Respectively, it is characteristic of the packaging material of the invention that it comprises the fibre base and the inner extruded polymer layer containing high-density polyethylene (HDPE) and acting as water vapour barrier on both sides, and the outer heat sealing layer.

According to the invention, a water vapour barrier is arranged on both sides of the packaging material so that the fibre base is protected from both the moistening caused by the packed product and the moisture penetrating from the outside of the package. The added water vapour barrier also has the effect that moisture is not able to influence the oxygen barrier layers possibly incorporated in the material from either direction, the said oxygen barrier layers being located so that they are left between two water vapour layers.

Compared with the state of the art, the solution of the invention intensifies the protection of the package against moisture penetrating from the outside so that, even in hot and damp circumstances, the base board and the possible interior barrier layers of the package are protected against moisture, thus retaining the properties which ultimately ensure also the preservation of the product in the package.

The curling problem related with the packaging material is again reduced or even totally eliminated so that, in accordance with the invention, the curling tendencies of the HDPE water vapour barrier layers extruded on both sides of the fibre base cancel each other out. At best this is realised as the HDPE layers on the opposite sides of the fibre base are approximately of the same thickness.

As the packaging material manufactured according to the invention is folded to a package, it may even make no difference for the water vapour barrier, which side of the material will be the exterior surface and which side the interior surface of the package. Thus, one embodiment of the invention is to provide a polymeric heat sealing layer on both sides of the fibre base and a barrier layer preventing the permeation of water vapour beneath it so that the structure of the material is symmetrical. In this case, the material can come to the folded package either way, irrespective of the barrier properties or other demands made on the package. In addition, a significant additional advantage is that the permeability of water vapour in the different directions of the package, i.e. from the outside into the package or from the inside out of the package, is the same.

The invention is further advantageously applicable so that at least one polymeric layer forming the oxygen layer is further provided on the one side of the fibre base. Such a packaging material, which is especially suitable for packages for liquid foods, is folded to a package so that the oxygen barrier remains inside the fibre base of the package in a way, which is in itself conventional. The interior multi-layer coating of the package then forms the oxygen and water vapour barrier protecting the product from the open air and the fibre base from the packed product, at the same time as the added external barrier layer of the package protects the fibre base and the oxygen barrier from moisture penetrating from the outside, thus ensuring that the package keeps its barrier and other properties during the preservation time required from it.

The water vapour permeability of the high-density polyethylene (HDPE) used as the polymer preventing the permeation of water vapour in the water vapour barrier layer is lower than that of conventional heat sealing polymers. The water vapour permeability of the coating can also be controlled with the help of layer thickness. HDPE combined with the most common heat sealing polymer LDPE stays imperforated in the heat sealing.

According to the invention, the weight of the HDPE layer forming the water vapour barrier can be, for example, 5–50 g/m$^2$, preferably 7–30 g/m$^2$, and most preferably 10–20 g/m$^2$. An efficient water vapour barrier polymer is Borstar-HDPE, the density of which is approximately 0.963 g/cm$^3$. It is possible to blend pigments or, for example, ferrous compounds, such as FeO to the water vapour barrier layer to capture oxygen.

A preferable polymer of the polyolefinic heat sealing layer is low-density polyethylene (LDPE), the layer weight of which can be, for example, 5–50 g/m$^2$, preferably 5–30 g/m$^2$, and most preferably 7–20 g/m$^2$. If a second suitable polymer is blended with LDPE in the heat sealing layer, such as polypropylene or polybutene, a jointing can be achieved, which opens when pulling off.

In the invention, LDPE refers to low-density polyethylene, the density of which is typically approximately 0.92 cm/$^3$, and at most 0.94 g/cm$^3$. Polyethylenes with a higher density than this are high-density polyethylenes (HDPE) in connection of the invention.

The weight of the EVOH or PA oxygen barrier layer to be possibly incorporated in the packaging material of the invention can be, for example, 3–15 g/m$^2$, preferably 5–10 g/m$^2$.

The packaging material according to the invention can be formed of a packaging board (paperboard/cardboard), the weight of the fibre base of which can vary between 130 and 500 g/m$^2$, being most preferably between 170 and 300 g/m$^2$. For example, a three-layer board generally used, for example, in polymer-coated packaging boards, is suitable to be used as the fibre base; in the three-layer board, the thicker layer of chemi-thermomechanical pulp (CTMP) is located between two thinner layers of sulphate pulp. In addition, the invention covers packaging papers, in which the weight of the fibre base is generally 20–120 g/m$^2$, most preferably 40–100 g/m$^2$.

It is characteristic of the sealed package of the invention, which is manufactured of a packaging material comprising a fibre base and polymeric heat sealing layers on both sides by folding and heat sealing that, in the material, under the outer heat sealing layer on both sides of the fibre base there is an extruded polymer layer containing high-density polyethylene (HDPE) and acting as water vapour barrier.

The package of the invention also advantageously comprises a polymeric oxygen barrier layer, which remains inside the fibre base of the packaging material, such as packaging board or paper. Thus, the package contains on its interior surface the oxygen barrier layer, the HDPE water vapour barrier layer, and further, the heat sealing layer forming the interior surface of the package. The exterior surface of the package includes the HDPE water vapour barrier layer and the heat sealing layer, and optionally also the exterior surface of the package can be provided with an oxygen barrier. Suitable oxygen barrier polymers are EVOH and PA, and suitable heat sealing polymer is LDPE.

The package of the invention can especially be a carton or box package formed of polymer-coated board or a bag package formed of polymer-coated paper. Especially dry and liquid foods can be mentioned as products to be packed.

Figure 8:
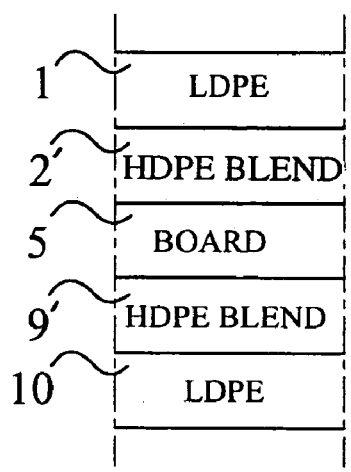
Figure 9:
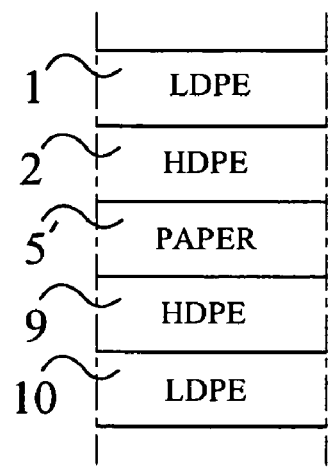
Figure 10:
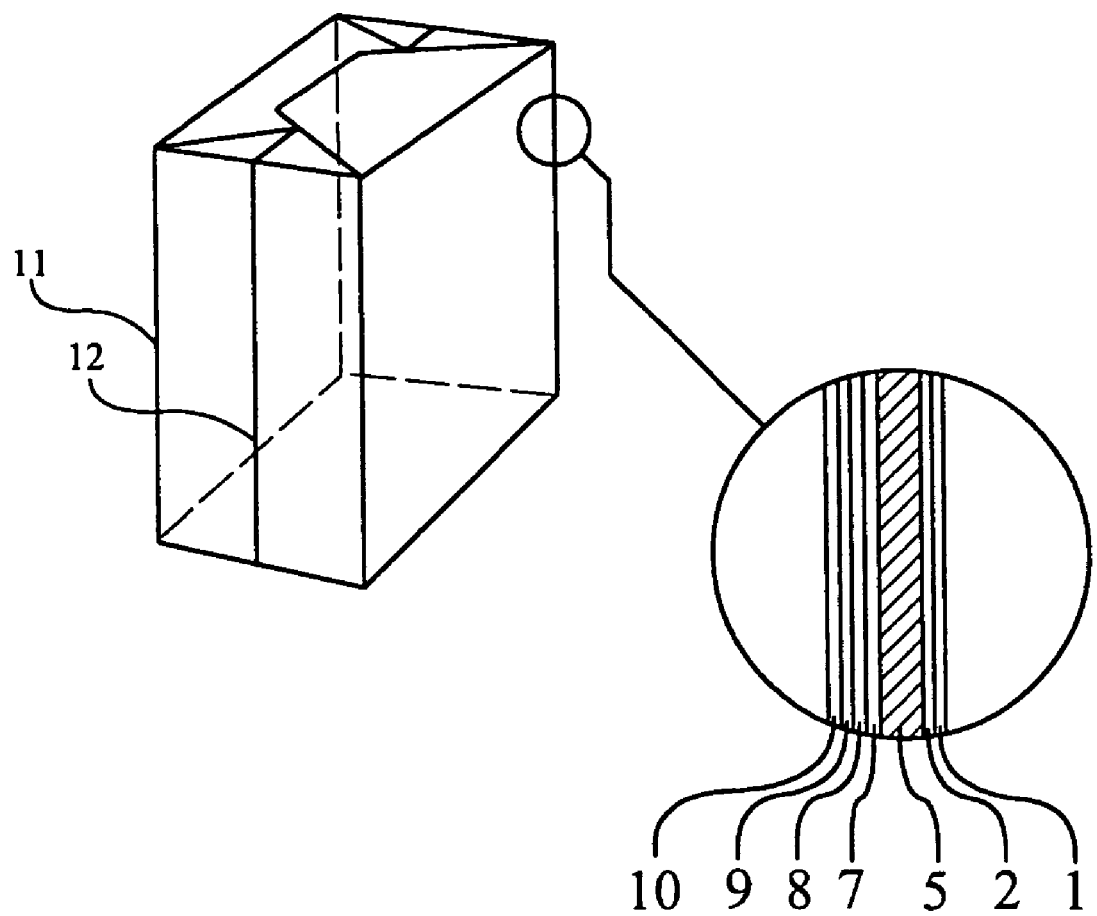
Figure 11:
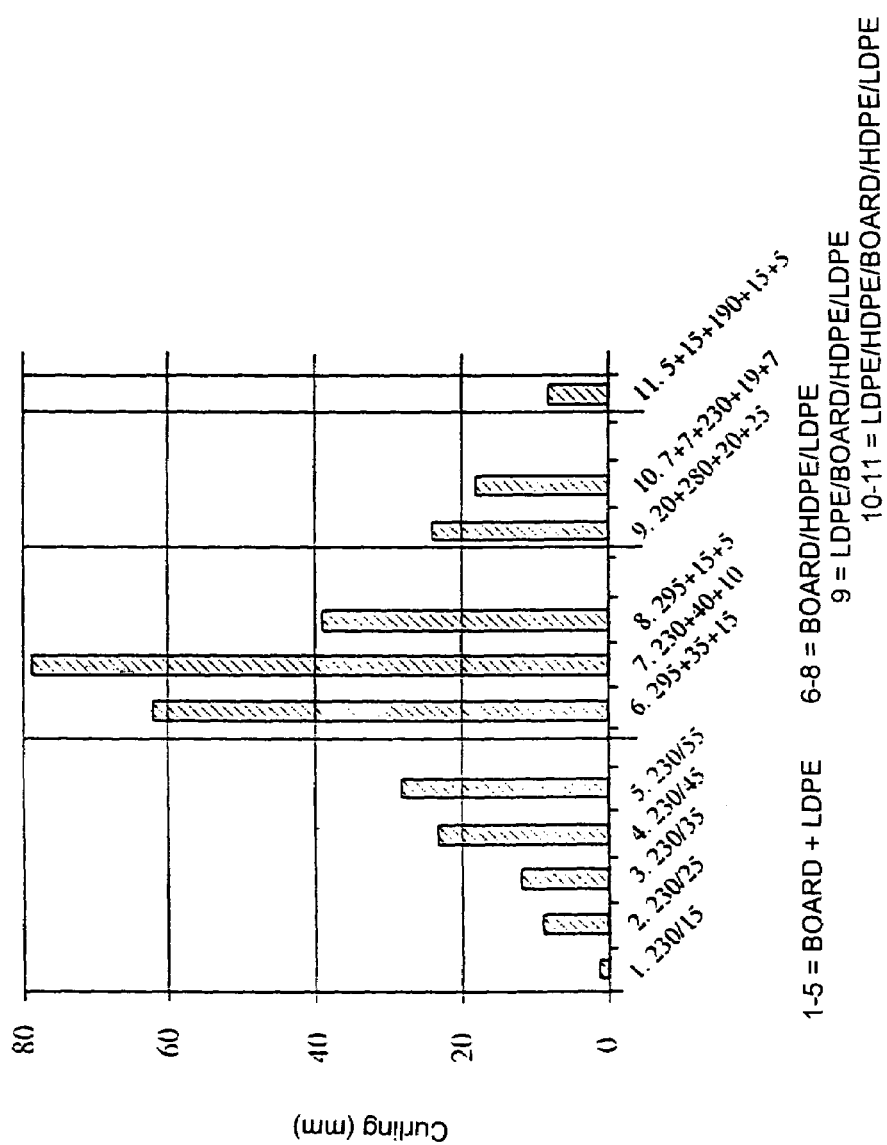

The invention is next described in more detail with the help of examples, referring to the enclosed drawings, in which FIGS. 1–9 present the layer structures of packaging materials of the invention as nine different embodiment alternatives, FIG. 10 presents a tin package of the invention, manufactured of packaging board by folding and heat sealing, and FIG. 11 presents the results of curling measurements performed, in form of a bar graph.

The polymer-coated packaging board shown in FIG. 1 comprises in the said order the LDPE heat sealing layer 1, the HDPE water vapour barrier layer 2, the fibre base 5, which is, for example, a three-layer board consisting of two sulphate pulp layers and of a CTMP layer between them, the HDPE water vapour barrier layer 9, and the LDPE heat sealing layer 10. The superimposed LDPE and HDPE layers 1, 2; 9, 10 on both sides of the fibre base 5 are formed by coextrusion. The weight of the fibre base 5 is, for example, 250 g/m$^2$, the weight of both the HDPE layers 2, 9 is, for example, 15 g/m$^2$, and the weight of both the LDPE layers 1, 10 is, for example, 15 g/m$^2$. Thus, the board has a completely symmetrical structure, in which case either one of the LDPE layers 1, 10 can be the exterior surface of the package to be folded from the board, and either one can be the interior surface. The board is especially suitable for packaging dry foods in countries, in which the climate is warm and damp.

Figure 2:
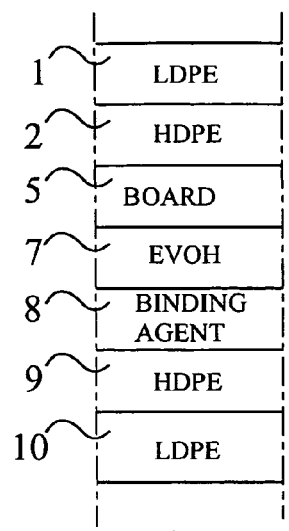

The packaging board shown in FIG. 2 comprises in the said order the LDPE heat sealing layer 1, the HDPE water vapour barrier layers 2, the fibre base 5, the EVOH oxygen barrier layer 7, the binding agent layer 8, for example, of graft polyethylene, the HDPE water vapour barrier layer 9, and the LDPE heat sealing layer 10. The polymer layers on both sides of the fibre base 5 have been produced by coextrusion. The weights of the LDPE, HDPE and fibre layers 1, 2, 5, 9 and 10 can correspond to the board in FIG. 1. The weight of the EVOH layer 7 can be, for example, 5 g/m$^2$, and the weight of the binding agent layer 8 can be, for example, 5 g/m$^2$. The board is meant to be folded to a package so that the LDPE layer 1 mentioned first will be the exterior surface of the package and the LDPE layer 10 mentioned last will be its interior surface, in which case the EVOH oxygen barrier layer 7 comes to the interior of the fibre base 5 in the package. The board is especially suitable for packaging liquid foods so that the HDPE layers 2, 9 on both sides of the fibre base give the necessary moisture protection to the other layers of the board at the same time as the EVOH layer 7 forms the oxygen barrier protecting the product.

Figure 3:
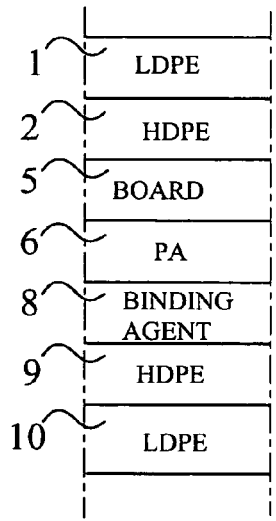

The packaging board according to FIG. 3 differs from the one shown in FIG. 2 only in that, instead of EVOH, the PA layer 6 is provided as the oxygen barrier. The suitable weight of the PA layer 6 is, for example, 7 g/m$^2$.

Figure 4:
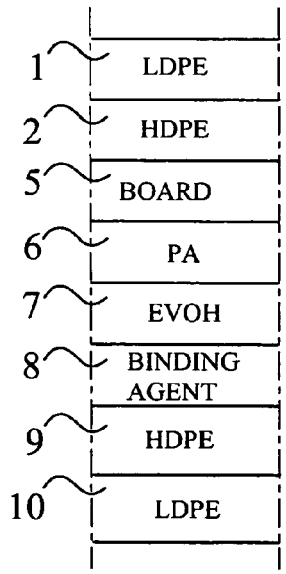
Figure 5:
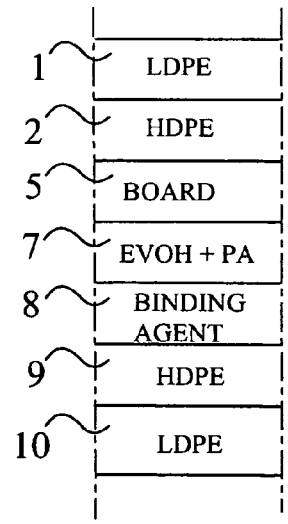

In FIG. 4, there is further shown an embodiment of the board according to the invention, in which the oxygen barrier is formed of superimposed PA and EVOH layers 6, 7. The weight of both these layers 6, 7 can be, for example, 5 g/m$^2$. In the board according to FIG. 5, the oxygen layer 7' is a blend of EVOH and PA.

Figure 6:
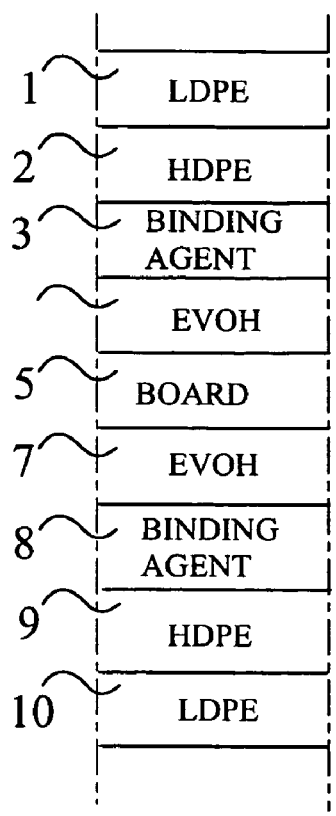

In FIG. 6, there is shown a packaging board, which comprises in the said order the LDPE heat sealing layer 1, the HDPE water vapour barrier layer 2, the binding agent layer 3, the EVOH oxygen barrier layer 4, the fibre base 5, which is a three-layer board similar to the embodiment in FIG. 1, the EVOH oxygen barrier layer 7, the binding agent layer 8, the HDPE water vapour barrier layer 9, and the LDPE heat sealing layer 10. The polymer layers on both sides of the fibre base 5 are most preferably produced by coextrusion. Respectively, the weights of the layers are, for example, the following: the fibre base 250 $g/m^2$, the LDPE layers 15 g/m, the HDPE layers 15 $g/m^2$, the EVOH layers 5 $g/m^2$, and the binding agent layer 5 $g/m^2$. The board is thus of a symmetrical structure, and when folding it to a package, its either side can be the exterior surface of the package and either side the interior surface.

Figure 7:
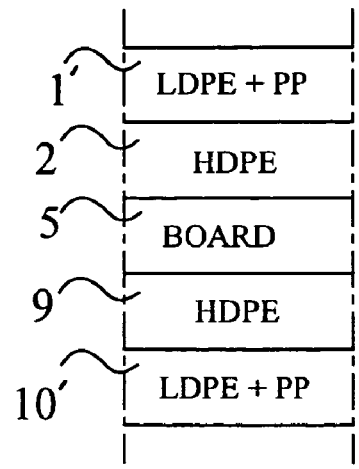

The packaging materials shown in FIGS. 7–9 are variations of the material according to FIG. 1. Thus, in the heat sealing layer 1', 10' of FIG. 7, LDPE has been replaced by a blend of it and polypropylene (PP). In the water vapour barrier layers 2', 9' of FIG. 8, a second component, for example, an oxygen capturing agent, such as ferro(II)oxide, or some other ferrite compound, has been blended with HDPE. In FIG. 9, instead of the packaging board, there is shown a packaging paper, the weight of the fibre base 5' of which is, for example, 80 $g/cm^3$. Where the polymeric coating layers are concerned, this packaging paper is similar to the board in FIG. 1.

In FIG. 10, there is shown an example of the package 11 of the invention, which is formed of a packaging blank by folding and heat sealing, the blank being made of the packaging board according to FIG. 2. The board is located in the package 11 so that on the exterior surface of the package outside the fibre base 5 there are the superimposed HEPD and LDPE layers 2, 1, in which case the four-layer coating 7, 8, 9, 10 containing the EVOH layer 7 remains inside the fibre base 5. In the joints 12 of the package 11, the edges of the blank have been made to overlap, and the LDPE layers 1, 10 of the opposite surfaces of the board have been tightly heat sealed to each other.

The package 11 according to FIG. 10 is as well suited for the package for liquid foods, such as milk products and juices, as for dry foods, such as flour, flakes, cereals, etc. According to the invention, essential in the package 11 is especially the protection of the packed product and the fibre base 5 from moisture penetrating from the outside with the help of the water vapour barrier layer 2 outside the fibre base.

Tests carried out with the new packaging boards according to the invention have been further explained in the following examples.

EXAMPLE 1

An extrusion-coated packaging board was manufactured, the layer structure of which was: LDPE layer, weight 5 $g/m^2$, HDPE layer, weight 15 $g/m^2$, base board, weight 190 $g/m^2$, HDPE layer, weight 15 $g/m^2$, and LDPE layer, weight 5 $g/m^2$. The water vapour permeation of this board was measured as 6.4 $g/m^2/d$ at the temperature of 38° in the relative humidity of 90%. The curling of the board was clearly small.

EXAMPLE 2

An extrusion-coated packaging board was manufactured, the layer structure of which was: LDPE layer, weight 10 $g/m^2$, HDPE layer, weight 10 $g/m^2$, base board, weight 255 $g/m^2$, HDPE layer, weight 20 $g/m^2$, and LDPE layer, weight 25 $g/m^2$. The water vapour permeation of this board was measured to be 4.6 $g/m^2/d$ at the temperature of 38° C. in the relatively humidity of 90%. The result is the average of the permeation values measured in different directions.

EXAMPLE 3

(Reference)

For reference, an extrusion-coated board was manufactured, the layer structure of which was: LDPE layer, weight 20 $g/m^2$, base board, weight 255 $g/m^2$, HDPE layer, weight 20 $g/m^2$, and LDPE layer, weight 25 $g/m^2$. The water vapour permeation of the board was 5.5 $g/m^2/d$, on average. The board was clearly more curled than the boards in Examples 1 and 2.

Curling Measurements

The enclosed FIG. 11 contains results of curling measurements, in which test strips were cut from extrusion-coated boards, the measures of which were 250×15 mm, and which were let freely hang in test circumstances at the temperature of 23° C. and in the relatively humidity of 50%. The strips were cut so that the results indicate the curling in the direction transverse to the machine. The graphs 1–5 present the measurement results of a reference test series, in which the one side of the base board with the weight of 230 $g/m^2$ was coated with the LDPE layer, the weight of which was 15, 25, 35, 45, or 55 $g/m^2$. Further, the graphs 6–8 are reference measurements of boards coated only from the one side, in which the inner layer was HDPE and the outer layer LDPE. The graph 6 concerns the structure: base board, weight 295 $g/m^2$, HDPE layer, weight 35 $g/m^2$, and LDPE layer, weight 15 $g/m^2$. The graph 7 concerns the structure: base board, weight 230 $g/m^2$, HDPE layer, weight 40 $g/m^2$, and LDPE layer, weight 15 $g/m^2$. The graph 8 concerns the structure: base board, weight 295 $g/m^2$, HDPE layer, weight 15 $g/m^2$, and LDPE layer, weight 5 $g/m^2$. When comparing the graphs 6–8 with the graphs 1–5, the tendency of HDPE to curl the board can be noted.

The graphs 9–11 concern boards extrusion-coated on both sides so that, besides LDPE layers, the coatings comprise an HDPE layer either on the one side of the board (graph 9) or on both sides (graphs 10 and 11). The graphs 10 and 11 represent the structures according to the invention. The completely symmetrical structure shown in graph 11, in which the weight of the base board was 190 $g/m^2$ and with inner HDPE layers with the weight of 15 $g/m^2$ on both sides of the base board and outer LDPE layers with the weight of 5 $g/m^2$, had the smallest curling in the direction of the machine. The board in question was the board described in Example 1.

The invention claimed is:

1. Method for manufacturing a heat sealable packaging material, in which method both sides of a fibre base are provided with a polymeric heat sealing layer, wherein a polymeric water vapour barrier layer containing high-density polyethylene (HDPE) is extruded on both sides of the fibre base so that the water vapour barrier layer remains between the fibre base and the outer heat sealing layer in the packaging material.

2. Method according to claim 1, wherein the inner water vapour barrier layer containing HDPE and the outer heat sealing layer are brought onto the fibre base in one step by coextrusion.

3. Method according to claim 2, wherein superimposed water vapour barrier and heat sealing layers are coextruded on both sides of the fibre base so that the layer structure of the packaging material thus achieved is symmetrical.

4. Method according to any one of the preceding claims, wherein the heat sealing layers contain low-density polyethylene (LDPE).

5. Method according to claim 1, wherein at least one extruded polymer layer forming an oxygen barrier is incorporated in the packaging material.

6. Polymer-coated heat sealable packaging material, wherein it is manufactured using a method according to claim 1 and that it comprises a fibre base and an inner extruded polymer layer containing high-density polyethylene (HDPE) and acting as a water vapour barrier layer and an outer heat sealing layer on both sides of the fibre base.

7. Packaging material according to claim 6, wherein the heat sealing layers contain low-density polyethylene (LDPE).

8. Packaging material according to claim 7, wherein the material consists of layers, the order of which is:
LDPE heat sealing layer;
HDPE water vapour barrier layer;
fibre base;
HDPE water vapour barrier layer; and
LDPE heat sealing layer.

9. Packaging material according to any one of the claims 6–8, wherein the weight of the water vapour barrier layers on both sides of the fibre base is the same, and that also the weight of the heat sealing layers on both sides of the fibre base is the same so that the layer structure of the packaging material is symmetrical.

10. Packaging material according to claim 6 or 7, wherein the material further comprises at least one polymer layer, which forms an oxygen barrier.

11. Packaging material according to claim 10, wherein the oxygen barrier layer contains ethyl vinyl alcohol copolymer (EVOH), polyamide (PA), or a mixture of these.

12. Packaging material according to claim 11, wherein the material consists of layers, the order of which is:
LDPE heat sealing layer;
HDPE water vapour barrier layer;
fibre base;
one or a plurality of EVOH and/or PA oxygen barrier layers;
polymeric binding agent layer;
HDPE water vapour barrier layer; and
LDPE heat sealing layer.

13. Packaging material according to claim 6, wherein the water vapour barrier layers are formed of Borstar-HDPE, the density of which is approx. 0.963 $g/cm^3$.

14. Packaging material according to claim 6, wherein the heat sealing layer is formed of LDPE, to which polypropylene (PP) has been blended.

15. Packaging material according to claim 6, wherein the fibre base is a board, the weight of which is 130–500 $g/m^2$, preferably 170–300 $g/m^2$.

16. Packaging material according to claim 6, wherein the fibre base is a paper, the weight of which is 20–120 $g/m^2$, preferably 40–100 $g/m^2$.

17. Packaging material according to claim 6, wherein the weight of the water vapour barrier layer is 5–50 $g/m^2$, preferably 7–30 $g/m^2$, and most preferably 10–20 $g/m^2$.

18. Packaging material according to claim 6, wherein the weight of the heat sealing layer is 5–50 $g/m^2$, preferably 5–30 $g/m^2$, and most preferably 7–20 $g/m^2$.

19. Packaging material according to claim 10, wherein the weight of the oxygen barrier layer is 3–15 $g/m^2$, preferably 5–10 $g/m^2$.

20. Sealed package, which has been manufactured by folding and heat sealing from a packaging material manufactured using a method according to claim 1, wherein, in the material, on both sides of a fibre base under an outer heat sealing layer there is an extruded polymer layer containing high-density polyethylene (HDPE) and acting as a water vapour barrier.

21. Package according to claim 20, wherein, inside the fibre base between it and the water vapour barrier layer there is further at least one polymer layer, forming an oxygen barrier.

22. Package according to claim 20 or 21, wherein it is a carton package for liquid food, formed of polymer-coated board.

23. Package according to claim 20 or 21, wherein it is a box package for dry food, formed of polymer-coated board.

24. Package according to claim 20 or 21, wherein it is a bag package formed of polymer-coated paper.

* * * * *